March 21, 1961  J. C. WESTON  2,976,191
METHOD OF KILLING ROOTS ADJACENT SEWER LINE JOINTS
Filed Jan. 9, 1958
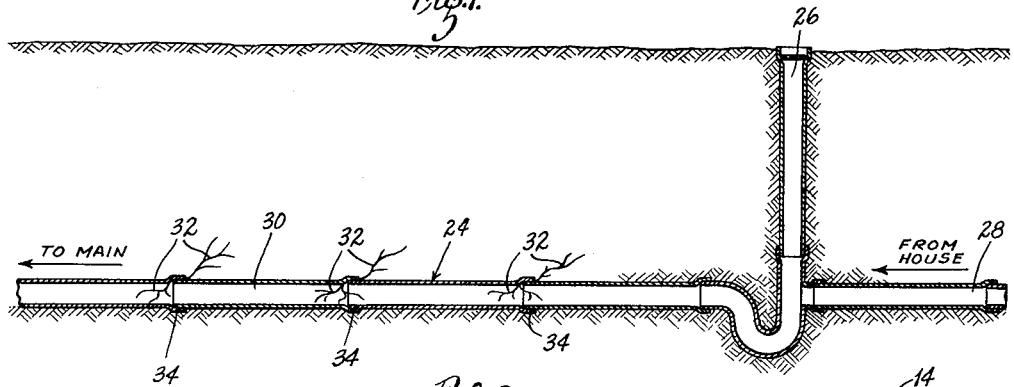
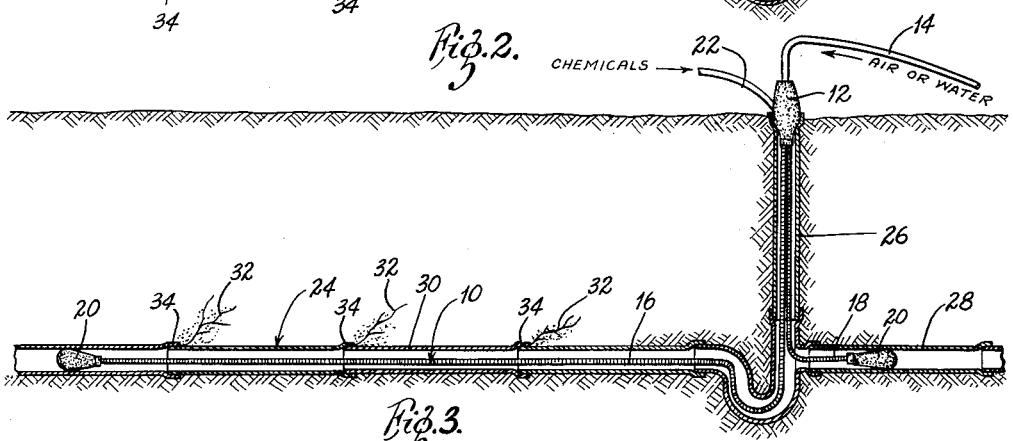
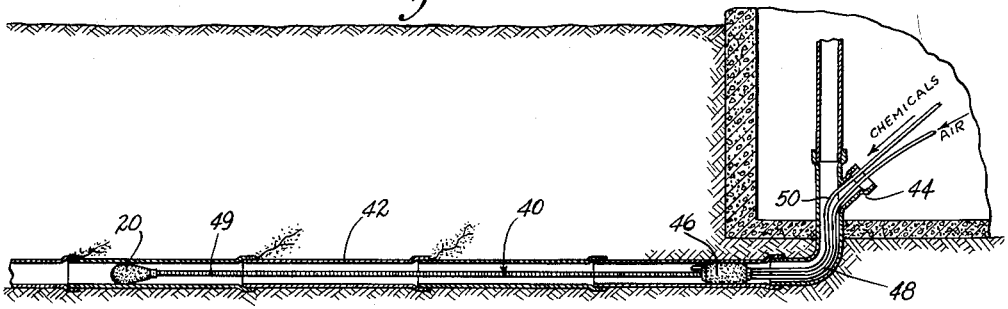
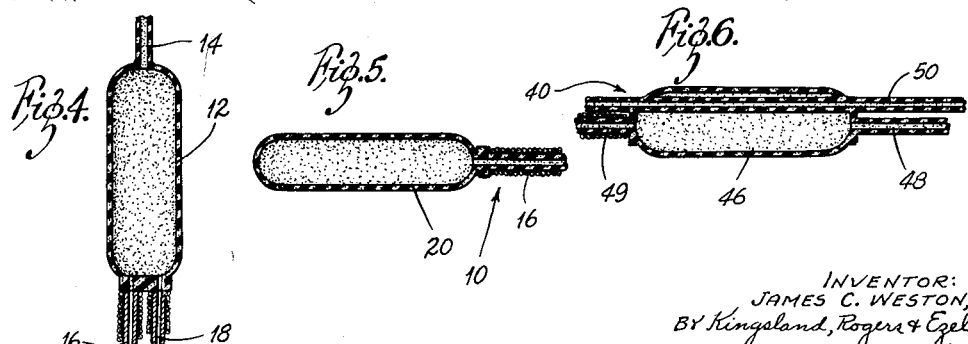
INVENTOR:
JAMES C. WESTON,
BY Kingsland, Rogers & Ezell
ATTORNEYS

United States Patent Office 2,976,191
Patented Mar. 21, 1961

2,976,191

METHOD OF KILLING ROOTS ADJACENT SEWER LINE JOINTS

James C. Weston, Webster Groves, Mo.
(14102 Marlow, Detroit 27, Mich.)

Filed Jan. 9, 1958, Ser. No. 707,980

2 Claims. (Cl. 134—24)

The present invention relates generally to sewer line maintenance, and more particularly to a novel method of preventing roots from growing through the joints of sewer lines.

In brief, the present invention comprises a novel method of treating root growth at sewer pipe junctures to prevent entry into the sewer line. A selected segment of pipe is blocked off and a suitable chemical, as copper sulphate, is forced under pressure out through the pipe joints into the surrounding earth. A novel blocking and chemical supply device is provided including inflatable members on hollow cables, which are inserted into the sewer pipe as required. Combined therewith are means for forcing chemicals through one or more of the inflatable members.

Therefore, an object of the present invention is to provide a novel method of preventing roots from growing through sewer pipe joints.

Another object is to provide a novel method of inhibiting tree root growth around sewer pipe joints without damaging the tree.

Another object is to provide a novel method of preventing root growth through sewer pipe joints which effectively accomplish the intended purpose in an economical, simple manner.

Other objects and advantages are apparent from the following description taken with the accompanying drawing, in which:

Figure 1 is a vertical, longitudinal, cross-sectional view through a typical house sewer line, showing root growth through joints, the tree being omitted;

Figure 2 is a view similar to Figure 1, with an embodiment of the present novel apparatus installed for carrying out the present novel method of root elimination;

Figure 3 is a view similar to Figure 2, illustrating a modified apparatus;

Figure 4 is an enlarged view of one form of inflatable stop bag;

Figure 5 is an enlarged view of a second form of inflatable stop bag; and

Figure 6 is an enlarged view of a third form of inflatable stop bag.

Referring to the drawing more particularly by reference numerals, in Figure 2, 10 indicates generally one embodiment of the present novel apparatus used for effectively chemically treating sewer lines. The apparatus 10 includes a base inflatable pressure bag 12 (Fig.4) into one end of which leads a fluid supply line 14 and from the other end of which lead hollow cables 16 and 18, one of which preferably is longer than the other. On the free end of each cable 16 and 18 is an inflatable pressure bag 20 (Fig. 5). The bag 12 may be secured to the line 14 and to the cables 16 and 18, and the bags 20 to the cables 16 and 18 by any suitable means, as externally threaded tube studs and nuts, or the connections may be integral. A line 22 for chemicals passes the yieldable bag 12 and is connected to a suitable chemical supply under pressure.

The apparatus 10 is illustrated in Figure 2 operatively disposed in a typical house sewer line 24 which includes a standpipe 26, a segment 28 between a house (not shown) and the standpipe 26, and a segment 30 between the standpipe 26 and a main sewer line (not shown). In Figure 1, root growth 32 is shown as both in and outside the sewer line 24, which is a normal situation where sewer lines run in the vicinity of trees and heavy shrubs, since it is very difficult to permanently seal the joint of sewer lines. In Figure 2, the root growth has been cleared from the interior of the sewer line 24 by suitable means to permit insertion of the apparatus 10, as shown.

The apparatus 10 is inserted into the standpipe 26 and into the sewer line segments 28 and 30 with the bags 12 and 20 inflated. A suitable fluid, as water or air, is then forced under pressure through the hollow cables 16 and 18 to inflate the terminal bags 20 and into the base bag 12 from a selected source, as a portable pump. A chemical, as copper sulphate, is supplied to the standpipe 26 under sufficient pressure to pass through the joints 34 of the sewer line segment 30 and into the soil thereadjacent. The copper sulphate will kill the root growth 32 in the vicinity of the sewer pipe line joints 34 without damaging the trees or shrubs. Further, the copper sulphate will remain in the soil around the joints 34 for several years, inhibiting further root growth in the areas. A combination of half copper sulphate and half sodium chromate has been used.

In Figures 3 and 6 is illustrated a modified apparatus 40 for use in house sewer lines 42 not having an outside vent or standpipe, but including a cleaning inlet 44.

The apparatus 40 includes an inflatable base bag 46 into one end of which leads a fluid supply line 48 and from the other end of which leads a hollow cable 49 to the free end of which is connected an inflatable bag 20. A line 50 for supplying chemicals runs through the base bag 46. The apparatus 40 is used in a manner similar to that described for the apparatus 10.

It is manifest that there have been provided novel apparatus for and a novel method of killing and inhibiting root growth around the joints of sewer lines without damaging the trees or shrubs.

It is to be understood that the foregoing description and the accompanying drawing have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. A method of destroying and inhibiting root growth around the peripheral exterior and interior of sewer line joints comprising blocking off a segment of sewer line including the joints through which roots have intruded into the sewer line by inserting an expansible blocking means at both ends of the area to be blocked and expanding the blocking means, supplying a root killing chemical under pressure into the blocked off sewer line segment, and forcing under pressure a quantity of the chemical through the sewer line joints into the soil area adjacent thereto.

2. A method of destroying and inhibiting root growth around the peripheral exterior and interior of sewer line joints comprising blocking off a segment of sewer line by inserting an expansible blocking means at both ends of the area to be blocked and expanding the blocking means, providing a channel through one of the blocking means into the blocked off segment of sewer line, supplying a root killing chemical under pressure through the channel into the blocked off sewer line segment, and forcing under pressure a quantity of the chemical through the sewer line joints between the blocking means into the soil area adjacent thereto.

References Cited in the file of this patent

UNITED STATES PATENTS

| | | |
|---|---|---|
| 1,814,677 | Fennema | July 14, 1931 |
| 1,848,269 | Petersen | Mar. 8, 1932 |
| 1,906,151 | Goodman | Apr. 25, 1933 |
| 2,273,984 | Osborn | Feb. 24, 1942 |
| 2,311,196 | Ahern | Feb. 16, 1943 |
| 2,397,328 | Ripley | Mar. 26, 1946 |
| 2,694,022 | Schreiner | Nov. 9, 1954 |